US012654112B2

(12) United States Patent
Roosen et al.

(10) Patent No.: US 12,654,112 B2
(45) Date of Patent: Jun. 16, 2026

(54) SYSTEMS AND METHODS FOR VAPORIZING HYDROCARBON FEEDS

(71) Applicant: SABIC GLOBAL TECHNOLOGIES B.V., Bergen op Zoom (NL)

(72) Inventors: Christoph Roosen, Geleen (NL); Sabriye Fredriksson, Geleen (NL); Arno Johannes Maria Oprins, Geleen (NL); Thomas Dijkmans, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 232 days.

(21) Appl. No.: 18/574,779

(22) PCT Filed: Jun. 27, 2022

(86) PCT No.: PCT/EP2022/067599
§ 371 (c)(1),
(2) Date: Dec. 28, 2023

(87) PCT Pub. No.: WO2023/274972
PCT Pub. Date: Jan. 5, 2023

(65) Prior Publication Data
US 2024/0424424 A1 Dec. 26, 2024

(30) Foreign Application Priority Data
Jul. 2, 2021 (EP) ..................................... 21183462

(51) Int. Cl.
B01D 1/14 (2006.01)
B01D 1/00 (2006.01)
C10G 9/24 (2006.01)

(52) U.S. Cl.
CPC ............. B01D 1/14 (2013.01); B01D 1/0017 (2013.01); B01D 1/0041 (2013.01); B01D 1/0082 (2013.01); C10G 9/24 (2013.01)

(58) Field of Classification Search
CPC .. B01D 1/0017; B01D 1/0041; B01D 1/0082; B01D 1/14; C10G 9/24
See application file for complete search history.

(56) References Cited

U.S. PATENT DOCUMENTS 7,288,690 B2 * 10/2007 Bellet .................. C10G 51/023
585/650
7,829,752 B2 * 11/2010 Baumgartner ......... C10G 51/00
585/650

(Continued)

FOREIGN PATENT DOCUMENTS

CN 1205470 C 6/2005
CN 206444405 U 8/2017

(Continued)

OTHER PUBLICATIONS

Foreign communication from related application—International Search Report and Written Opinion dated Oct. 10, 2022 for application No. PCT/EP2022/067599 filed Jun. 27, 2022, 13 pages.

(Continued)

*Primary Examiner* — Jonathan Miller
(74) *Attorney, Agent, or Firm* — Norton Rose Fulbright US LLP

(57) ABSTRACT

Systems and methods to enhance vaporization of a hydrocarbon feed may include an evaporator positioned to receive a hydrocarbon feed and partially evaporate the hydrocarbon feed to provide a gaseous hydrocarbon portion and a liquid hydrocarbon portion. A first mixing unit may be positioned to receive the gaseous hydrocarbon portion and dilution steam and provide a hydrocarbon-steam mixture. A heater may be positioned to receive the hydrocarbon-steam mixture to provide a heated hydrocarbon-steam mixture. A second mixing unit may be positioned to receive the liquid hydrocarbon portion and the heated hydrocarbon-steam mixture and to evaporate at least a portion of the liquid hydrocarbon (Continued)

portion via energy associated with the heated hydrocarbon-steam mixture to provide one or more of an evaporated hydrocarbon portion or a heated liquid hydrocarbon portion.

18 Claims, 10 Drawing Sheets

(56)                    References Cited

U.S. PATENT DOCUMENTS

|  |  |  |  |  |
|---|---|---|---|---|
| 8,083,932 | B2 * | 12/2011 | Baumgartner | C10G 9/20 |
|  |  |  |  | 585/650 |
| 10,703,999 | B2 * | 7/2020 | Choi | B01J 3/008 |
| 12,246,299 | B2 * | 3/2025 | Mortensen | C10G 9/24 |
| 2007/0232845 | A1 * | 10/2007 | Baumgartner | C10G 9/14 |
|  |  |  |  | 422/198 |
| 2008/0097132 | A1 | 4/2008 | Prindle Jr. et al. |  |
| 2009/0050530 | A1 * | 2/2009 | Spicer | C10G 9/20 |
|  |  |  |  | 422/600 |
| 2009/0054716 | A1 * | 2/2009 | Baumgartner | C10G 9/20 |
|  |  |  |  | 585/648 |
| 2016/0097002 | A1 | 4/2016 | Sundaram |  |
| 2018/0265792 | A1 * | 9/2018 | Choi | C10G 53/02 |
| 2020/0172814 | A1 | 6/2020 | Oud |  |
| 2022/0395805 | A1 * | 12/2022 | Mortensen | B01J 19/2485 |
| 2023/0013408 | A1 * | 1/2023 | Hirst | C10G 9/36 |

FOREIGN PATENT DOCUMENTS

|  |  |  |  |  |  |
|---|---|---|---|---|---|
| EP | 3725865 | A1 * | 10/2020 | | C10G 9/24 |
| EP | 3730592 | A1 * | 10/2020 | | C10G 9/24 |
| WO | 2009088413 | A1 | 7/2009 | | |
| WO | 2020150244 | A1 | 7/2020 | | |

OTHER PUBLICATIONS

Foreign communication from related application—European Search Report dated Nov. 24, 2021 for application No. EP21183462.7 filed Jul. 2, 2021, 7 pages.

* cited by examiner

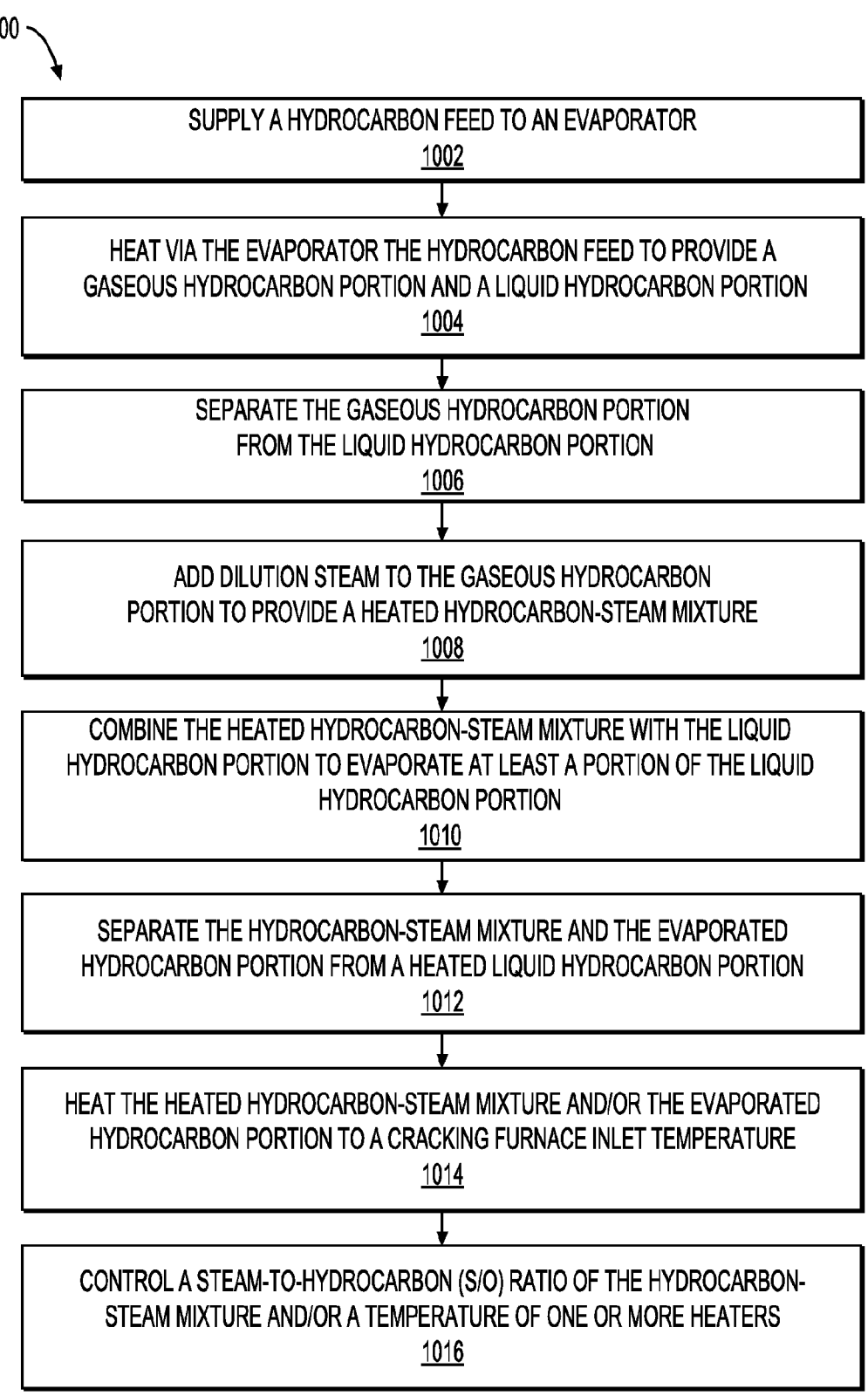

1000

SUPPLY A HYDROCARBON FEED TO AN EVAPORATOR
1002

HEAT VIA THE EVAPORATOR THE HYDROCARBON FEED TO PROVIDE A
GASEOUS HYDROCARBON PORTION AND A LIQUID HYDROCARBON PORTION
1004

SEPARATE THE GASEOUS HYDROCARBON PORTION
FROM THE LIQUID HYDROCARBON PORTION
1006

ADD DILUTION STEAM TO THE GASEOUS HYDROCARBON
PORTION TO PROVIDE A HEATED HYDROCARBON-STEAM MIXTURE
1008

COMBINE THE HEATED HYDROCARBON-STEAM MIXTURE WITH THE LIQUID
HYDROCARBON PORTION TO EVAPORATE AT LEAST A PORTION OF THE LIQUID
HYDROCARBON PORTION
1010

SEPARATE THE HYDROCARBON-STEAM MIXTURE AND THE EVAPORATED
HYDROCARBON PORTION FROM A HEATED LIQUID HYDROCARBON PORTION
1012

HEAT THE HEATED HYDROCARBON-STEAM MIXTURE AND/OR THE EVAPORATED
HYDROCARBON PORTION TO A CRACKING FURNACE INLET TEMPERATURE
1014

CONTROL A STEAM-TO-HYDROCARBON (S/O) RATIO OF THE HYDROCARBON-
STEAM MIXTURE AND/OR A TEMPERATURE OF ONE OR MORE HEATERS
1016

*FIG. 10*

SYSTEMS AND METHODS FOR VAPORIZING HYDROCARBON FEEDS

CROSS REFERENCE TO RELATED APPLICATIONS

The present application is a national phase application under 35 U.S.C. § 371 of International Application No. PCT/EP2022/067599, filed Jun. 27, 2022, which claims the benefit of priority to European Patent Application No. 21183462.7, filed Jul. 2, 2021, each of which are incorporated herein by reference in their entirety.

TECHNICAL FIELD

The present disclosure relates to systems and methods for vaporizing hydrocarbon feeds and, more particularly, to systems and methods to enhance vaporization of hydrocarbon feeds, particularly for electrically powered cracking furnaces.

BACKGROUND

Steam cracking of hydrocarbon feedstock in a steam cracking furnace is a common method for producing numerous desired petroleum-derived products. In many steam cracking processes, a hydrocarbon feedstock is supplied to a convection section of a steam cracking furnace. In the convection section, the hydrocarbon feedstock may be heated to a higher intermediate temperature before being mixed with dilution steam and thereafter heated further to a temperature closer to a cracking temperature sufficient to carry out an endothermic reaction for cracking the hydrocarbons. The preheated hydrocarbon feedstock and dilution steam mixture may be fed to a radiation section of the steam cracking furnace, which may include radiant coils in which the mixture is further heated to a temperature sufficient for causing the endothermic reaction and cracking hydrocarbons in the mixture. In gas-fired steam cracking furnaces, heat required for the convection section may be provided by hot effluent from the radiation section. The cracked mixture may thereafter be fed to a heat exchanger to rapidly quench the cracked mixture to minimize undesired post-cracking reactions and, in some instances, to recover heat from the process.

The heat for the radiation section may be provided by burning hydrocarbons and/or hydrogen, or by electrically-powered heating. If provided by electrically-powered heating, hot effluent from the radiation section is not available for use by the convection section to evaporate and/or preheat the hydrocarbon feedstock. Thus, in such systems heat for evaporation of the hydrocarbon feedstock and preheating of the feedstock and dilution steam mixture may be provided by electrically-powered heaters. However, some hydrocarbon feedstocks contain mixtures of many hydrocarbon components, sometimes resulting in the hydrocarbon feedstock having a wide boiling range. In addition, some hydrocarbon feedstocks may exhibit an elevated potential for fouling due to the presence of reactive molecules and contaminants, as well as amounts of high boiling material that may be more difficult to vaporize. As a result, heating some hydrocarbon feedstocks to provide a sufficient level of evaporation and/or a sufficient increase in temperature prior to being fed to a cracking furnace may result in an undesirably high amount of equipment fouling. Thus, for some hydrocarbon feedstocks, it may be difficult to sufficiently evaporate and/or preheat the hydrocarbon feedstock without increasing the likelihood or causing fouling of one or more components of the hydrocarbon cracking system.

Electrical vaporization of hydrocarbons comes with extra challenges compared to the vaporization in conventional convection sections. In a convection section of a conventional feed-flue gas heat exchanger, the maximum tube metal temperature (TMT) can never be higher than the temperature of the flue gas. Electrical heaters operate with a constant heat flux. Hence, the temperature at a specific spot of the element depends strongly on the state of the liquid. Surfaces in contact with the liquid feedstock show a much lower temperature than surfaces in contact with gas or gas bubbles. Consequently, bubble formation at the surface needs to be avoided as otherwise heating elements could quickly fail. An attempt to provide a method for producing olefins utilizing whole crude oil and/or natural gas condensate is described in International Publication No. WO 2009/088413 A1 to Equistar Chemicals, LP ("the '413 publication"). In particular, the '413 publication describes a method for thermally cracking a feed composed of whole crude oil and/or natural gas condensate as a feedstock for an olefin production plant that uses hydrocarbon thermal cracking in a pyrolysis furnace in combination with a partitioned vaporization unit. The '413 publication describes using a self-contained vaporization facility that operates separately from and independently of convection and radiant sections of the furnace. According to the '413 publication, the crude oil and/or condensate feed is preheated in the convection section of the furnace, passed out of the convection section and the furnace to a standalone vaporization facility. The vaporous hydrocarbon product of the standalone facility is then passed back into the furnace to enter the radiant section.

Applicant has recognized that the methods of '413 publication may still result in a need for systems and methods for producing petroleum-derived products from hydrocarbons that may be more accurately controlled or adjustable for different types of hydrocarbons, and that are more efficient and/or more environmentally friendly. For example, although the methods described in the '413 publication may provide gains in efficiency and an ability to crack whole crudes, they may still be less efficient than desired, and further, the methods described in the '413 publication may result in an undesirably high emission of carbon dioxide.

Accordingly, Applicant has recognized a need for systems and methods for sufficiently of electrical vaporizers, for sufficiently evaporating hydrocarbon feeds without causing failure of electrical vaporizer elements due to not optimized evaporation behavior, for sufficiently evaporating hydrocarbon feeds without causing undesirably high fouling, for sufficiently evaporating hydrocarbon feeds including multiple hydrocarbons and/or having a wide boiling range, and/or for evaporating hydrocarbon feeds in a more efficient and/or more environmentally friendly manner. The present disclosure may address one or more of the above-referenced issues, as well as other possible issues.

SUMMARY

The present disclosure is generally directed to systems and methods for electrically vaporizing hydrocarbon feeds and, more particularly, to systems and methods to enhance electrical vaporization of hydrocarbon feeds. As noted above, it may be difficult to evaporate a hydrocarbon feed having a wide boiling range without causing undesirable fouling of components of a cracking system on electrical heating elements and/or without hot-spot formation of heating element surface with consequent failure of such element.

In some embodiments according to the present disclosure, a vaporization assembly may include an electrical evaporator configured to receive a hydrocarbon feed and to provide a gaseous hydrocarbon portion, and a mixing unit configured to receive the gaseous hydrocarbon portion and dilution steam and to heat the gaseous hydrocarbon portion prior to being mixed with a liquid portion and/or prior to being heated to a furnace inlet temperature. In some embodiments, this may result in reducing the fouling potential of the hydrocarbon feed, for example, even for hydrocarbon feeds including multiple components and/or having a wide boiling range. Thus, at least some embodiments of the systems and methods disclosed herein may result in enhanced vaporization of hydrocarbon feeds, reduced fouling, and/or evaporation of hydrocarbon feeds in a more efficient and/or more environmentally friendly manner and reducing the risk of equipment fouling.

According some embodiments, a vaporization assembly to enhance vaporization of a hydrocarbon feed in an electrically-powered steam cracking furnace may include an electrically-powered evaporator positioned to receive a hydrocarbon feed and partially evaporate the hydrocarbon feed to provide a gaseous hydrocarbon portion and a liquid hydrocarbon portion. The vaporization assembly may further include a first mixing unit positioned to receive the gaseous hydrocarbon portion and dilution steam and to combine the gaseous hydrocarbon portion and the dilution steam to provide a hydrocarbon-steam mixture. The vaporization assembly further may include a an electrically-powered heater positioned to receive the hydrocarbon-steam mixture and heat the hydrocarbon-steam mixture to provide a heated hydrocarbon-steam mixture. The vaporization assembly also may include a second mixing unit positioned to receive the liquid hydrocarbon portion and the heated hydrocarbon-steam mixture and to evaporate at least a portion of the liquid hydrocarbon portion via energy associated with the heated hydrocarbon-steam mixture to provide one or more of an evaporated hydrocarbon portion or a heated liquid hydrocarbon portion.

According to some embodiments, a method to enhance vaporization of a hydrocarbon feed may include supplying a hydrocarbon feed to an evaporator and heating via the evaporator the hydrocarbon feed to provide a gaseous hydrocarbon portion and a liquid hydrocarbon portion. The method further may include separating the gaseous hydrocarbon portion from the liquid hydrocarbon portion, and adding dilution steam to the gaseous hydrocarbon portion to provide a hydrocarbon-steam mixture. The method also may include combining the hydrocarbon-steam portion with the liquid hydrocarbon portion to evaporate at least a portion of the liquid hydrocarbon portion via energy associated with the hydrocarbon-steam mixture to provide one or more of an evaporated hydrocarbon portion or a heated liquid hydrocarbon portion.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 10 is a block diagram of an example method to enhance vaporization of a hydrocarbon feed according to embodiments of the disclosure.

DETAILED DESCRIPTION

Figure 1:
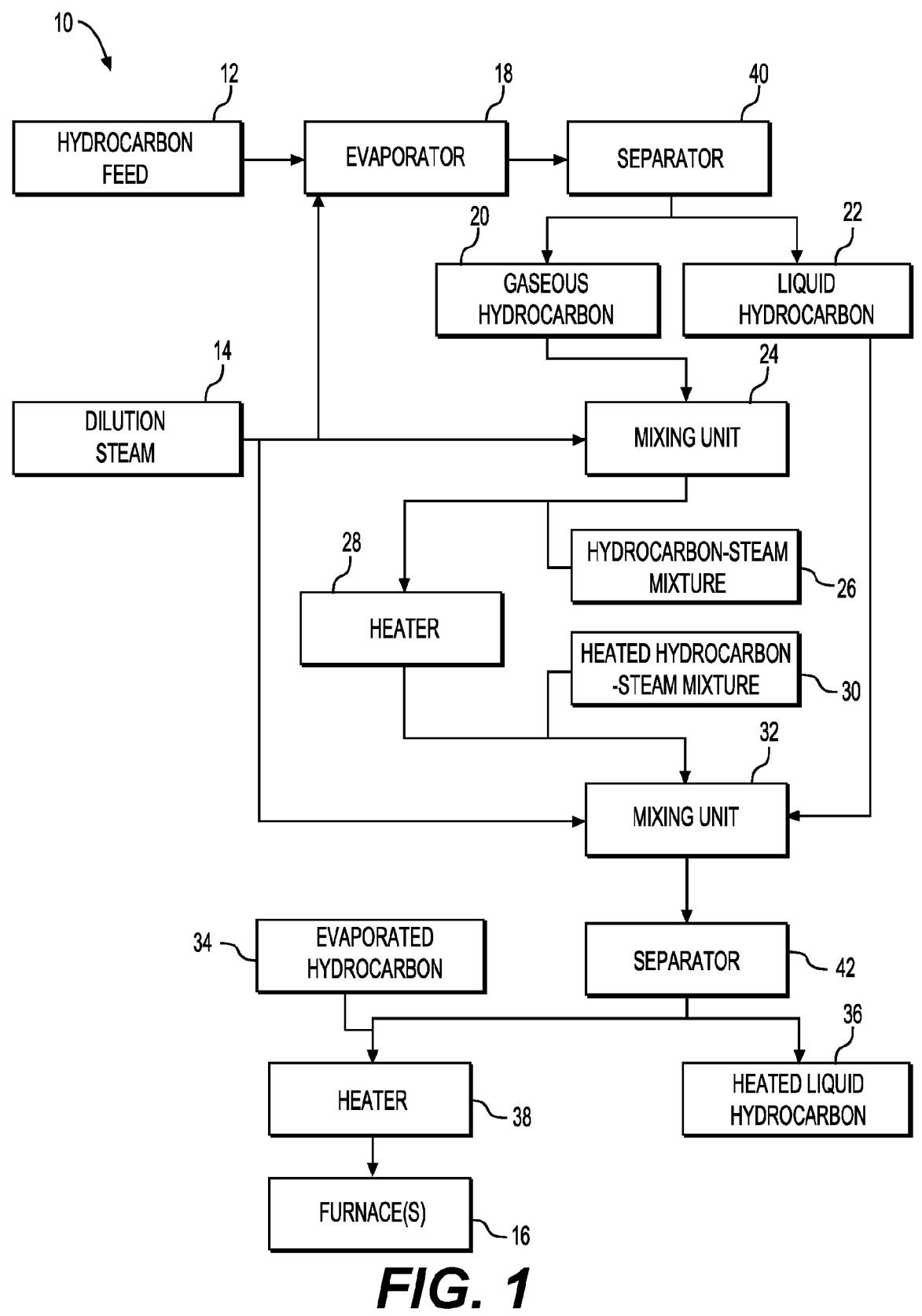
FIG. 1 schematically illustrates an example vaporization assembly according to embodiments of the disclosure.

The drawings may use like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

In conventional naphtha cracking, naphtha is vaporized and preheated in a convection section of a cracking furnace in a very specific way. First, the naphtha is mostly vaporized (typically, 85% or more of the naphtha is vaporized) in a bank of convection section tubes. Second, the mostly vaporized naphtha is mixed with superheated dilution steam, outside the convection section, to finish the vaporization. Then, the fully vaporized naphtha/steam mixture is further heated in another bank of convection section tubes before going into the cracking furnace radiant section.

Vaporization in the first bank of convection section tubes occurs in a plug-flow manner. As the naphtha travels down the tube, a larger and larger fraction is vaporized. Avoidance of crossing from a two-phase mixture to a fully vaporized mixture (or having a "dry point") in the convection section tubes is preferred because small amounts of heavies can be deposited on the hot tube surface and over time can lead to significant fouling. That is why the final vaporization is done outside the convection section and by mixing.

Low carbon emitting processes are ones where carbon dioxide emissions to the atmosphere are minimized or eliminated. If we consider a low carbon emitting steam cracker that uses an electrically powered furnace, there will be no flue gas, hence no convection section, and, a new way to vaporize naphtha is required.

Electric process heaters operating on resistive heating technology are known to the chemical industry in varied applications. Most commonly, electric heaters are employed on machinery lube oil heating or dryer regeneration gas heating. Even boiling applications, such as pure component vaporizers for liquids such as ammonia and propane have been designed. Using electric heaters to boil mixtures is a natural extension of electric heating technology application. However, in addition to the process design challenges in electrified steam cracker process design, it is necessary to overcome and address the technical challenges of using them for naphtha and other multicomponent and wide boiling mixtures in steam cracking applications. The steam cracking feed needs to transform from a fully liquid to a fully vapor feed.

Electrically heated vaporizers are not conventional for multicomponent feeds. Electric heaters behave differently than conventional steam or flue gas fired heaters. They operate with constant heat flux across the heat generating element. Therefore, with two phases present, such as gas and liquid, where there are differences in thermal diffusivity among the phases (e.g., gas thermal diffusivity is less than liquid thermal diffusivity), inhomogeneous heat fluxes can lead to localized higher than desired heating element temperature and thus heating element burnout. Furthermore, and more specifically to steam cracking, having solid phase heavies deposits in equipment near where full vaporization occurs is even more critically damaging to electric heaters because the resulting deposits will locally increase the thermal resistance, leading to higher heating element temperatures generated on the resistive wire and element burnout. Commercial scale heating duty requirements for naphtha vaporization service are greater than currently available electric heating technology in a single unit, so number of heaters, placement, and controls also must be taken into account.

Another constraint in using electric resistive heaters compared to a conventional feed heater in a furnace convection section is fluids in electric heaters are always on the shell side of the exchanger because the electric heating elements are in the tube. The conventional geometry cannot be directly applied in using electric resistive heaters on liquids steam cracking feed preheat.

Designs to address the technical challenges are described herein. In doing so, it may be necessary to manage the fluid (vapor/liquid) phases contacting the electric heating elements at all points in the design while maintaining the process demands and requirements already inherent in steam cracking of liquid feedstocks.

The general concept is that naphtha may be vaporized by steam or by electric heating in a conventional "reboiler" style vaporizer. In these schemes, the tube bundle may be submerged in liquid and the vaporization may be a CSTR (continuously stirred tank reactor) configuration. In electric heating, it may be critical to keep the tubes submerged because any tubes that become dry may overheat and may very likely burnout causing a shutdown.

When vaporization is done in a CSTR style reboiler, any heavies in the liquid may accumulate and build up in the pool of boiling liquid. To deal with this problem, in certain embodiments of the present invention a draw may be taken from the pool of liquid and that draw may be mixed with a superheated stream consisting of dilution steam and the vaporized hydrocarbons from the reboiler where the heavies are vaporized. That mixture may then be further heated and sent to the electric cracking furnace.

There are a variety of specific flow schemes and options consistent with this broaded concept and they are described in the figures and in the claims.

FIG. 1 schematically illustrates an example vaporization assembly 10 for enhancing vaporization of a hydrocarbon feed 12 according to embodiments of the disclosure. In some embodiments, the vaporization assembly 10 may be used to at least partially evaporate a hydrocarbon feed 12 and/or heat a mixture of the hydrocarbon feed 12 and dilution steam 14 in preparation for supplying the heated mixture to one or more furnaces 16, for example, a cracking furnace for producing petroleum-derived products, such as, for example, olefins. Other uses for the at least partially evaporated hydrocarbon feed and/or the heated mixture of the hydrocarbon feed 12 and dilution steam 14 are contemplated. In some embodiments, the hydrocarbon feed 12 may include, for example, multiple hydrocarbon components having a wide boiling range, and in some embodiments, the hydrocarbon feed 12 may include, for example, one or more of ethane, propane, liquefied petroleum gas (e.g., C4-LPG), naphtha, gas condensate, gas oil, diesel, jet fuel, gas-to-liquid (GTL) fuel, pyrolysis oils, feedstocks derived from recycled plastics, or biofeedstock. In some examples, the dilution steam 14 may include, for example, one or more of hydrogen, water, methane, or nitrogen. In some embodiments, the dilution steam 14 may include one or more of super-heated dilution steam or saturated vapor.

As shown in FIG. 1, in some embodiments, the vaporization assembly 10 may include an electrical evaporator 18 positioned to receive the hydrocarbon feed 12 and at least partially evaporate the hydrocarbon feed 12 to provide a gaseous hydrocarbon portion 20 and a liquid hydrocarbon portion 22. In some embodiments, the evaporator 18 may include a heater including one or more of an electrically-powered heater, a heat exchanger supplied with steam, a heat exchanger supplied with hot effluent from a furnace (e.g., a radiation furnace), or a heat source integrated with a production facility (e.g., an olefin production facility, such as a cracking furnace). For example, the evaporator 18 may include submerged heating tubes, a thermos-syphon, forced circulation, a double-shell system including a heat transfer medium, one or more of an electric shell-and-tube heat exchanger or a non-electric shell-and-tube heat exchanger, a non-electric shell-and-tube heat exchanger using as a heat source saturated, high-pressure steam generated in a transfer-line exchanger (TLE), a heat exchanger supplied with hot effluent from a furnace (e.g., a radiation furnace), and/or a heat integration stream. In some embodiments, the evaporator 18 may be operated, for example, such that heated surfaces of the evaporator 18 have a surface temperature of 450 degrees C. or less. This may reduce the likelihood of, or prevent, fouling caused by overheating the hydrocarbon feed 12.

As shown in FIG. 1, in some embodiments, the vaporization assembly 10 may further include a first mixing unit 24 configured to receive the gaseous hydrocarbon portion 20 and dilution steam 14 and to combine the gaseous hydrocarbon portion 20 and the dilution steam 14 to provide a hydrocarbon-steam mixture 26. In some embodiments, the hydrocarbon-steam mixture 26 may have a steam-to-hydrocarbon ratio (S/O) ranging from 0.3 to 2.0. The dilution steam 14 may be used to heat the gaseous hydrocarbon portion 20 in the first mixing unit 24. For example, the dilution steam 14 may be superheated, and the superheated dilution steam 14 may increase the temperature of the gaseous hydrocarbon portion 20, such that the hydrocarbon-steam mixture 26 has a temperature closer to, for example, a furnace inlet temperature. For example, the superheated dilution steam 14 may have a temperature ranging from 500 degrees C. to 600 degrees C. (e.g., about 550 degrees C.).

As shown in FIG. 1, in some embodiments, the vaporization assembly 10 may further include a heater 28 configured to receive the hydrocarbon-steam mixture 26 and heat the hydrocarbon-steam mixture 26 to provide a heated hydrocarbon-steam mixture 30. In certain embodiments, the heater 28 is an electrical heater. In some embodiments, mixing the hydrocarbon feed 12 and/or the gaseous hydrocarbon portion 20 with dilution steam 14 in the first mixing unit 24 upstream relative to the heater 28 may result in reducing the hydrocarbon partial pressure and/or reducing the fouling potential of the gaseous hydrocarbon portion 20 in the heater 28 and/or other components of the vaporization assembly 10. The heater 28 may include submerged heating tubes, a thermos-syphon, forced circulation, a double-shell system including a heat transfer medium, one or more of an electric shell-and-tube heat exchanger or a non-electric shell-and-tube heat exchanger, a non-electric shell-and-tube heat exchanger using as a heat source saturated, high-pressure steam generated in a transfer-line exchanger (TLE), a heat exchanger supplied with hot effluent from a furnace (e.g., a radiation furnace), and/or a heat integration stream.

As shown in FIG. 1, in some embodiments, the vaporization assembly 10 may include a second mixing unit 32 configured to receive the liquid hydrocarbon portion 22 and the heated hydrocarbon-steam mixture 30 and to evaporate at least a portion of the liquid hydrocarbon portion 22, for example, via energy associated with the heated hydrocarbon-steam mixture 30, to provide an evaporated hydrocarbon portion 34 and/or a heated liquid hydrocarbon portion 36.

In some embodiments, for example, as shown in FIG. 1, the vaporization assembly 10 also may include a second heater 38 positioned to receive the heated hydrocarbon-steam mixture 30 and/or the evaporated hydrocarbon portion 34, and heat the heated hydrocarbon-steam mixture 30 and/or the evaporated hydrocarbon portion 34. For example, the second heater 38 may be configured to heat the heated hydrocarbon-steam mixture 30 and/or the evaporated hydrocarbon portion 34 to a temperature ranging from, for example, 500 degrees C. to 800 degrees C. (e.g., from 550 degrees C. to 750 degrees C.). For example, the second heater 38 may be configured to heat the heated hydrocarbon-steam mixture 30 and/or the evaporated hydrocarbon portion 34 to a temperature for being supplied to a cracking furnace inlet. In some embodiments, the second heater 38 may be configured to heat the heated hydrocarbon-steam mixture 30 and/or the evaporated hydrocarbon portion 34 to a relatively lower temperature (e.g., lower than 500 degrees C.) and rely on the one or more furnace(s) 16 to add any additional heat to increase the temperature to a cracking temperature. The second heater 38 may be a heater including one or more of an electrically-powered heater, a heat exchanger supplied with steam, a heat exchanger supplied with hot effluent from a furnace (e.g., a radiation furnace), a heat source integrated with a production facility (e.g., an olefin production facility, such as a cracking furnace), and/or any other suitable heater type.

As shown FIG. 1, in some embodiments, the vaporization assembly 10 may include a separator 40 configured to receive a feed from evaporator 18. The separator 40 separates the feed from evaporator 18 into an evaporated portion of the gaseous hydrocarbon portion 20 and the liquid hydrocarbon portion 22. As shown, in some embodiments, the separator 40 may be upstream relative to the first mixing unit 24. In some embodiments, the separator 40 may be an integrated portion of the evaporator 18, and in some embodiments, may be separate from the evaporator 18.

In some embodiments, as shown in FIG. 1, the vaporization assembly 10 may include a separator 42 configured to receive an exit stream from the mixing unit 32. The separator 42 may separate the exit stream from the mixing unit 32 into an evaporated hydrocarbon portion 34 and/or the heated liquid hydrocarbon portion 36. As shown, in some embodiments, the separator 42 may be upstream of the second heater 38. In some embodiments, the separator 42 may be an integrated portion of the second mixing unit 32, and in some embodiments, the separator 42 may be separate from the second mixing unit 32.

As shown in FIG. 1, in some embodiments, the evaporator 18 may be configured to receive dilution steam 14 to heat the hydrocarbon feed 12, for example, upstream relative to the evaporator 18 or at the evaporator 18. In some embodiments, the second mixing unit 32 may be configured to receive dilution steam 14 to heat the liquid hydrocarbon portion 22 and the heated hydrocarbon-steam mixture 30.

Figure 2:
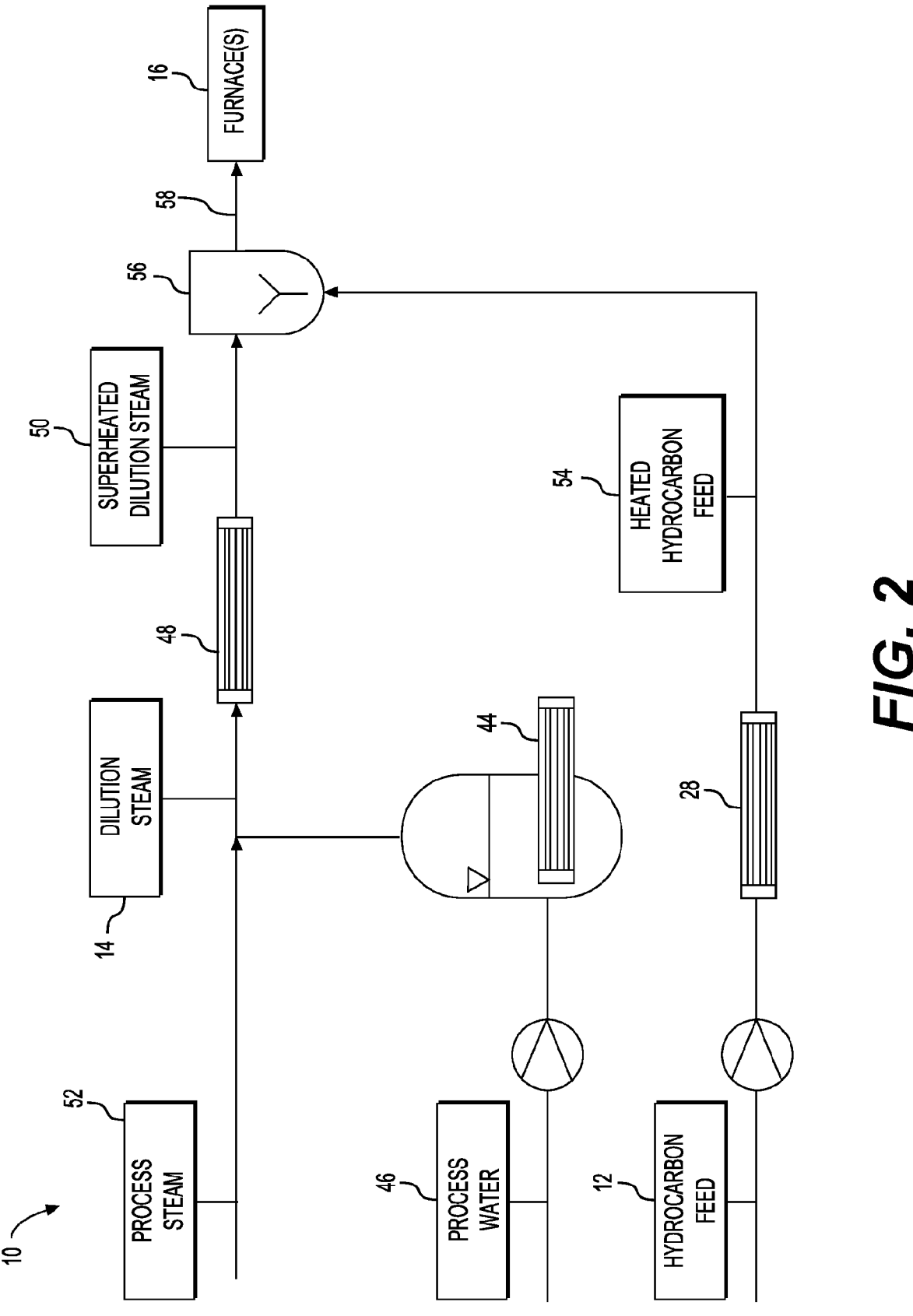
FIG. 2 schematically illustrates another example vaporization assembly according to embodiments of the disclosure.

FIG. 2 schematically illustrates another example vaporization assembly 10 according to embodiments of the disclosure. As shown in FIG. 2, in some embodiments, the vaporization assembly 10 may include a heater 44 positioned to receive process water 46 and to heat the process water 46 to provide the dilution steam 14. In some embodiments, the heater 44 may include an electrically-powered heater and/or heat may be supplied from other systems associated with the production facility. For example, the heater 44 may be, or include, a dilution steam generator, for example, heat-integrated with a steam cracker radiation section. As shown in FIG. 2, some embodiments of the vaporization assembly 10 may include a steam heater 48 configured to receive dilution steam 14 and heat the dilution steam 14 to provide superheated dilution steam 50. In some embodiments, the steam heater 48 may also be configured to receive process steam 52 from, for example, the production facility, and the steam heater 48 may heat the process steam 52 and the dilution steam 14 to provide the super-heated dilution steam 50.

In the embodiment shown in FIG. 2, the vaporization assembly 10 may receive the hydrocarbon feed 12 and heat the hydrocarbon feed 12 via a heater 28 to provide a heated hydrocarbon feed 54. The vaporization assembly 10 may also include a mixing unit 56 configured to receive the superheated dilution steam 50 and the heated hydrocarbon feed 54 and to further heat the heated hydrocarbon feed 54 via the heat of the superheated dilution steam 50 to provide an at least partially evaporated hydrocarbon-steam mixture 58. Thereafter, the at least partially evaporated hydrocarbon-steam mixture 58 may be supplied to one or more furnace(s) 16, which may be gas-fired or electrically-powered cracking furnaces. In some embodiments, additional heating of the at least partially evaporated hydrocarbon-steam mixture 58 may occur between the mixing unit 56 and the one or more furnace(s) 16.

In the embodiment shown in FIG. 2, the heat for evaporation of the hydrocarbon feed 12 may be provided (e.g., entirely) by the superheated dilution steam 50. As a result, the steam-to-hydrocarbon (S/O) ratio may need to be relatively higher in order to evaporate the hydrocarbons. In addition, the temperature of the superheated dilution steam 50 may need to be relatively higher. The furnace(s) 16, which may be electrically-powered, may also need to provide relatively more heat, and the load on the primary fractionator may be relatively higher. These potential consequences of the embodiment of vaporization assembly 10 shown in FIG. 2 may result in reducing the energy efficiency of the vaporization assembly 10 and/or the production facility.

Figure 3:
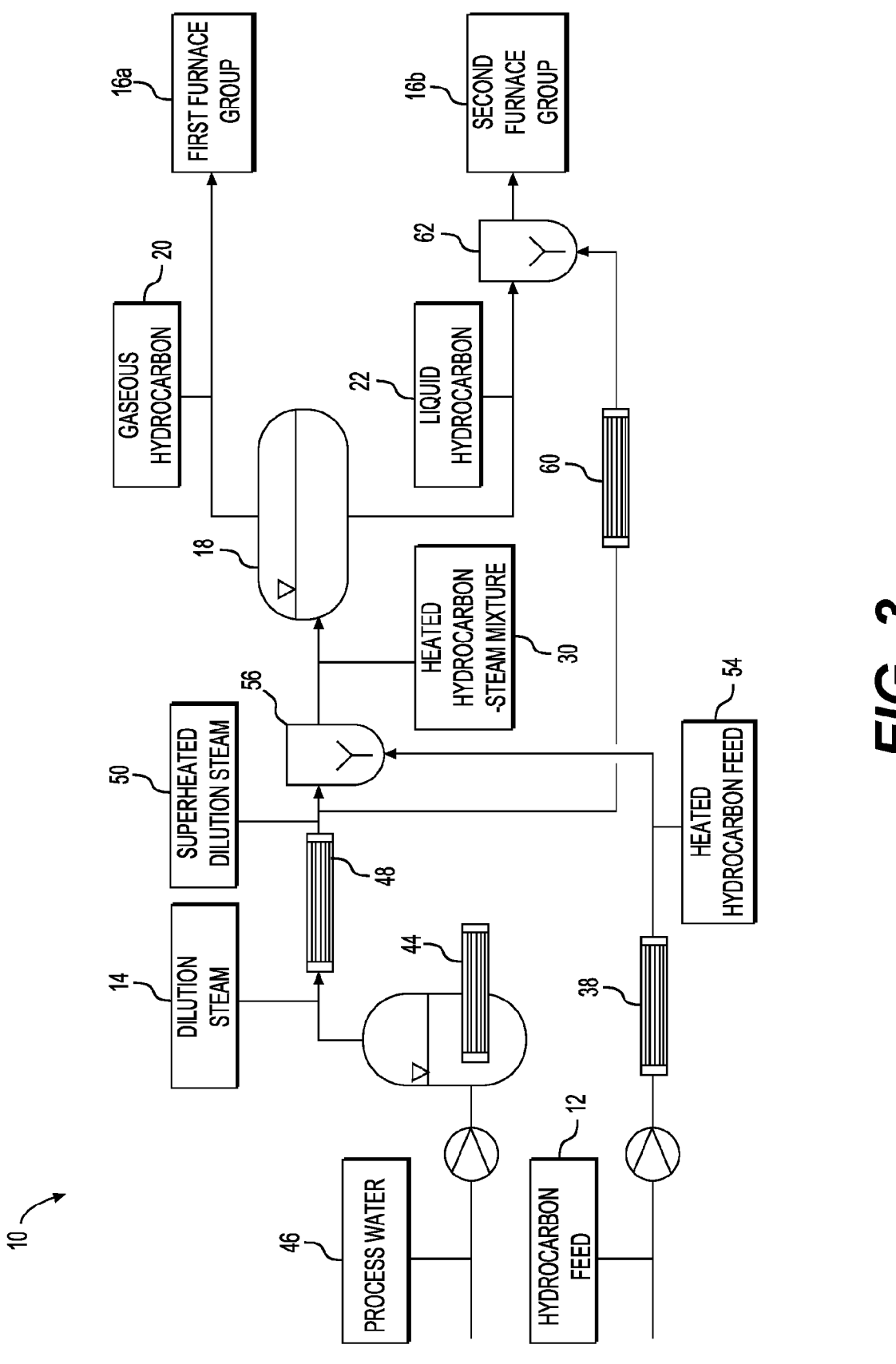
FIG. 3 schematically illustrates still another example vaporization assembly according to embodiments of the disclosure.

FIG. 3 schematically illustrates still another example vaporization assembly 10 according to embodiments of the disclosure. The embodiment of vaporization assembly 10 shown in FIG. 3 is similar to the embodiment of vaporization assembly 10 shown in FIG. 2, except the embodiment shown in FIG. 3 includes an evaporator 18, which may be used to heat the heated hydrocarbon-steam mixture 30 and separate the heated hydrocarbon-steam mixture 30 into a gaseous hydrocarbon portion 20 and a liquid hydrocarbon portion 22. Further, in some embodiments, the vaporization assembly 10 may include a steam heater 60 (e.g., a superheater) configured to receive a portion the superheated dilution steam 50 and heat the portion of the superheated dilution steam 50 to increase the temperature of the portion the superheated dilution steam 50 supplied to the steam heater 60. The embodiment shown in FIG. 3 also includes a second mixing unit 62 configured to receive the liquid hydrocarbon portion 22 from the evaporator 18 and mix the liquid hydrocarbon portion 22 with the superheated dilution steam 50 heated by the steam heater 60. In addition, in some embodiments, as shown in FIG. 3, the one or more furnace (s) 16 may include a first furnace group 16a including one or more furnaces configured to receive a hydrocarbon-steam mixture including the gaseous hydrocarbon portion 20 from the evaporator 18, and a second furnace group 16b including one or more furnaces configured to receive the liquid hydrocarbon portion 22 and the superheated dilution steam 50 from the second mixing unit 62.

As shown in FIG. 3, in some embodiments, the process water 46 may be supplied to the heater 44, which may heat the process water 46 to generate dilution steam 14, which may be supplied to the steam heater 48 to heat the dilution steam 14 to provide the superheated dilution steam 50. The hydrocarbon feed 12 may be supplied to the heater 38 to increase the temperature of the hydrocarbon feed 12. The heated hydrocarbon feed 12 and a first portion of the superheated dilution steam 50 may be supplied to the mixing unit 56 to provide a heated hydrocarbon-steam mixture 30, which is supplied to the evaporator 18. The evaporator 18 may be configured to at least partially evaporate the heated hydrocarbon-steam mixture 30 to provide the gaseous hydrocarbon portion 20 mixed with steam, which may be supplied to the first furnace group 16a for further processing, such as cracking. A second portion of the superheated dilution steam 50 may be supplied to the steam heater 60 for further heating and thereafter supplied to the second mixing unit 62 to be combined with the liquid hydrocarbon portion 22 received from the evaporator 18. The mixture of the heated superheated dilution steam 50 and the liquid hydrocarbon portion 22 may thereafter be supplied to the second furnace group 16b for further processing, such as cracking.

Relative to the example embodiment shown in FIG. 2, the example embodiment of evaporator assembly 10 shown in FIG. 3 may result in a relatively reduced steam-to-hydrocarbon (S/O) ratio of the hydrocarbon-steam mixture supplied to the first furnace group 16a, which may include one or more furnaces. In addition, in some embodiments, the load on the primary fractionator may be reduced in the embodiment shown in FIG. 3 relative to the embodiment shown in FIG. 2, and/or the embodiment shown in FIG. 3 may be relatively more energy efficient than the embodiment shown in FIG. 2.

In the embodiment shown in FIG. 3, the first and second furnace groups 16a and 16b may need to be operated for different S/O ratios, for example, since the liquid hydrocarbon portion 22 will require relatively more superheated dilution steam 50 for processing in the second furnace group 16b relative to the amount of superheated dilution steam 50 for processing the gaseous hydrocarbon portion 20 supplied to the first furnace group 16a. In addition, for the embodiment shown in FIG. 3, several processing parameters may need to be controlled, such as, for example, a split ratio of the first portion of the superheated dilution steam 50 supplied to the mixing unit 56 for combining with the heated hydrocarbon feed 12 and the second portion of the superheated dilution steam 50 supplied to the steam heater 60.

Figure 4:
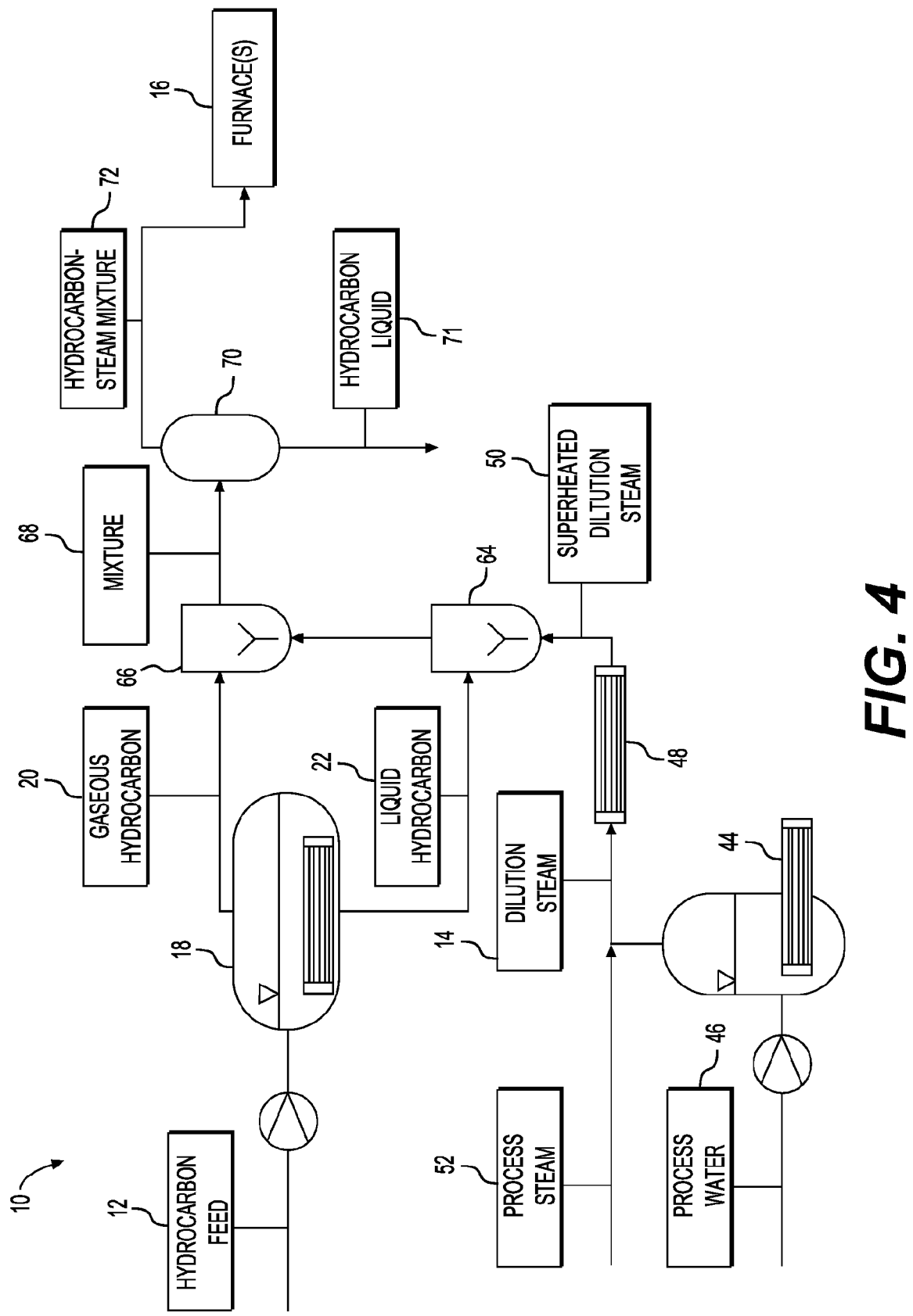
FIG. 4 schematically illustrates a further example vaporization assembly according to embodiments of the disclosure.

FIG. 4 schematically illustrates a further example vaporization assembly 10 according to embodiments of the disclosure. In the embodiment shown in FIG. 4, the vaporization assembly 10 includes an evaporator 18 configured to receive the hydrocarbon feed 12 and heat the hydrocarbon feed 12 to provide a gaseous hydrocarbon portion 20 and a liquid hydrocarbon portion 22. The liquid hydrocarbon portion 22 may be supplied to a mixing unit 64, where it may be combined with superheated dilution steam 50 received from a steam heater 48. The combined liquid hydrocarbon portion 22 and superheated dilution steam 50 may be supplied to a second mixing unit 66, where it may be combined with the gaseous hydrocarbon portion 20 to provide a mixture 68 of the gaseous hydrocarbon portion 20, the liquid hydrocarbon portion 22 heated by the superheated dilution steam 50 in the mixing unit 64, and the superheated dilution steam 50. The vaporization assembly 10 shown in FIG. 4 may also include a separator 70 configured to receive the mixture 68 from the second mixing unit 66 and separate any remaining hydrocarbon liquid 71 from the mixture 68 before the remaining hydrocarbon-steam mixture 72 is supplied to the one or more furnace(s) 16 for further processing, for example, cracking.

The embodiment shown in FIG. 4 may result in heat for vaporization of the hydrocarbon feed 12 being at least partially provided by the evaporator 18, which may be a dry evaporator. The steam-to-hydrocarbon (S/O) ratio of the remaining hydrocarbon-steam mixture 72 may be relatively lower, for example, as compared to the embodiment shown in FIG. 3 for the first and/or second furnace groups 16a and/or 16b.

Figure 5:
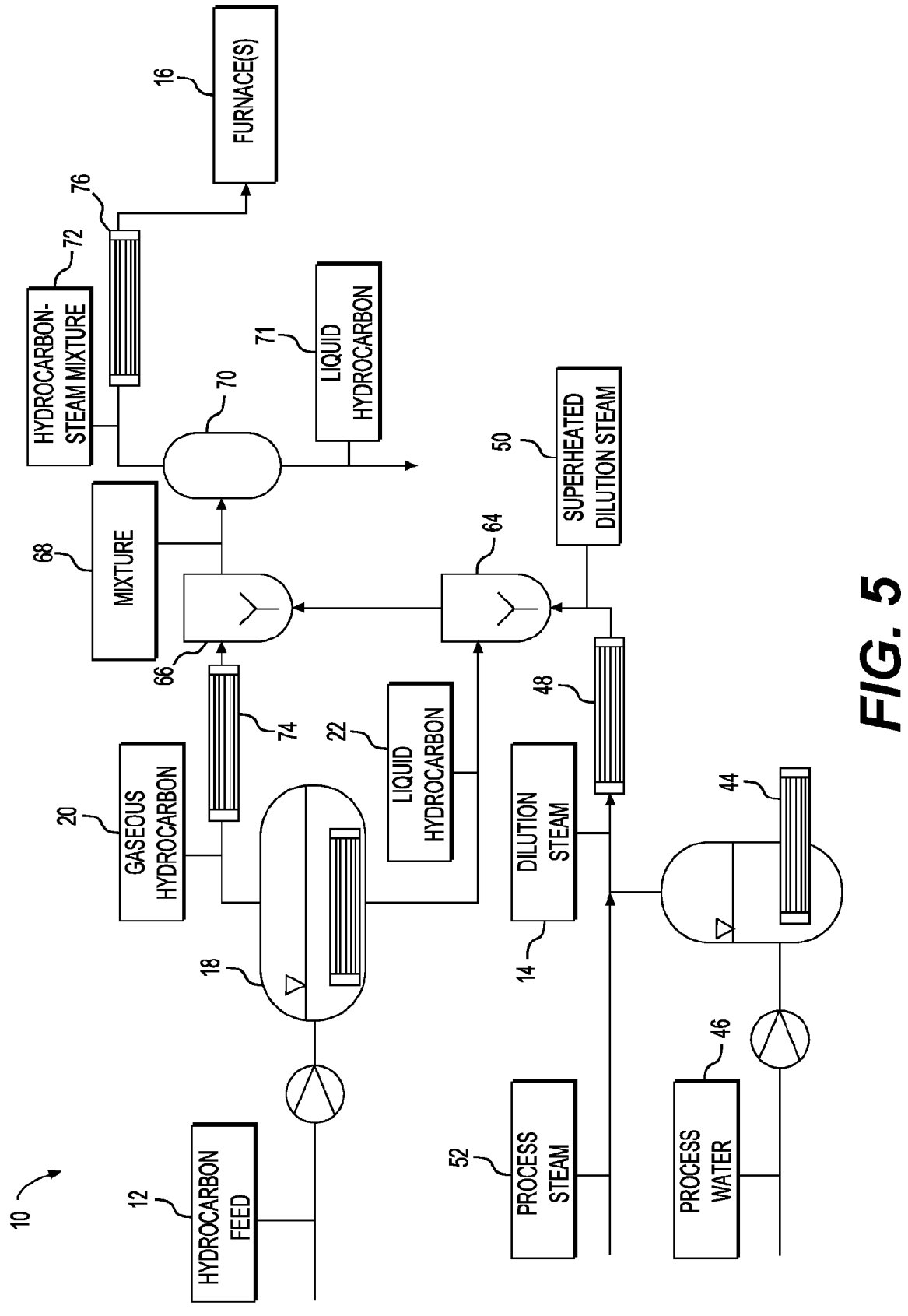
FIG. 5 schematically illustrates yet a further example vaporization assembly according to embodiments of the disclosure.

FIG. 5 schematically illustrates yet a further example vaporization assembly 10 according to embodiments of the disclosure. Relative to the embodiment shown in FIG. 4, the example vaporization assembly 10 shown in FIG. 5 includes a gaseous portion heater 74 downstream of the evaporator 18 and configured to receive the gaseous hydrocarbon portion 20 and heat the gaseous hydrocarbon portion 20, for example, prior to the gaseous hydrocarbon portion 20 reaching the second mixing unit 66. In addition, the embodiment shown in FIG. 5 also includes an inlet heater 76 downstream of the second mixing unit 66 (and in some embodiments, the separator 70) configured to receive the remaining hydrocarbon-steam mixture 72 and to heat the remaining hydrocarbon-steam mixture 72 to a temperature closer to the desired inlet temperature for the one or more furnace(s) 16. Relative to the embodiment shown in FIG. 4, the embodiment shown in FIG. 5 may result in inhibiting or preventing condensation in the second mixing unit 66. In addition, the inlet heater 76 may be used to adjust and/or improve control of the temperature of the remaining hydrocarbon-steam mixture 72 prior to entering the one or more furnace(s) 16.

Figure 6:
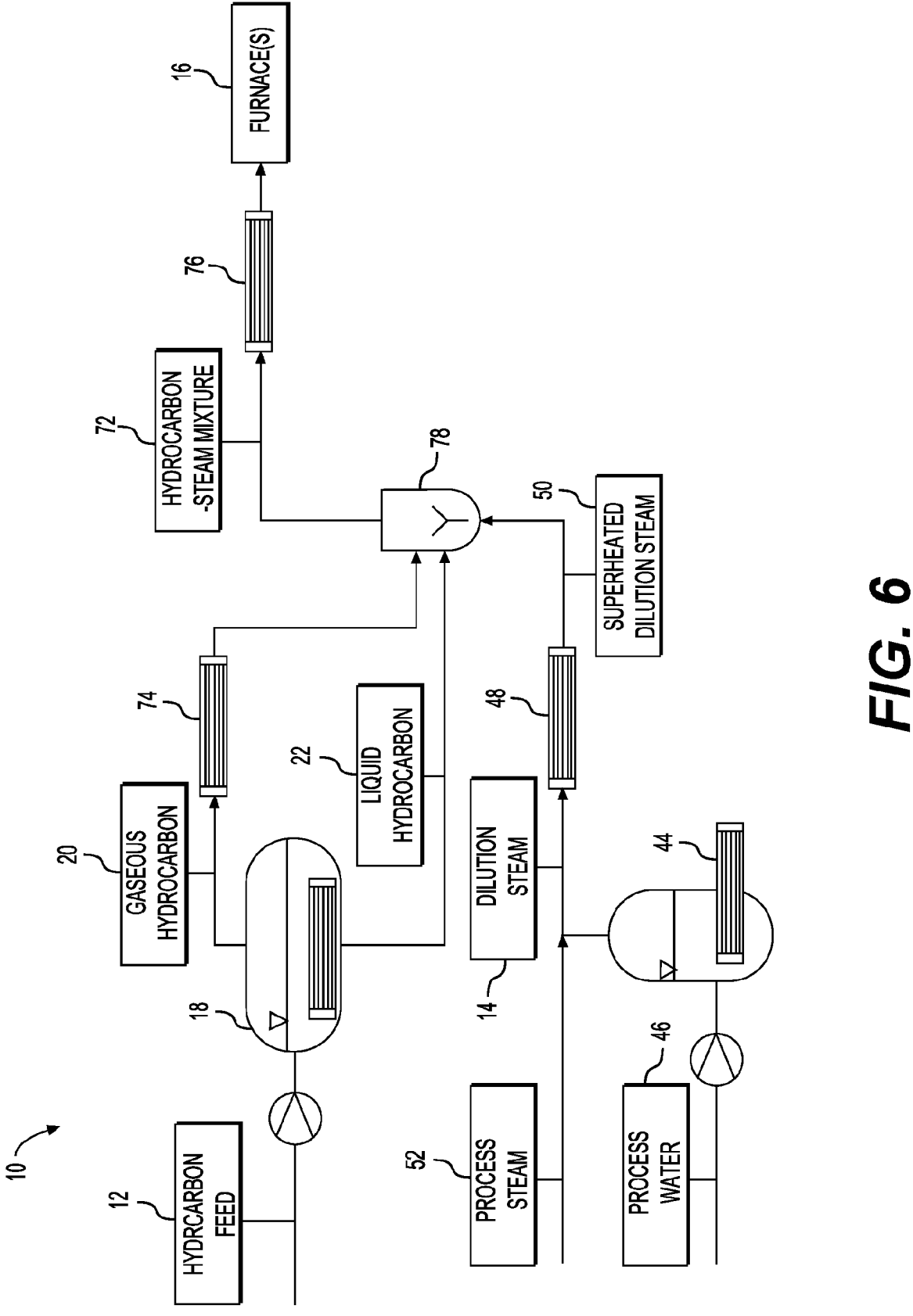
FIG. 6 schematically illustrates yet another example vaporization assembly according to embodiments of the disclosure.

FIG. 6 schematically illustrates yet another example vaporization assembly 10 according to embodiments of the disclosure. The example vaporization assembly shown in FIG. 6 is similar to the example shown in FIG. 4, except that the gaseous hydrocarbon portion 20 and the liquid hydrocarbon portion 22 are combined in a mixing unit 78 with superheated dilution steam 50. Similar to the example shown in FIG. 5, the vaporization assembly shown in FIG. 6 includes a gaseous portion heater 74 downstream of the evaporator 18 (e.g., a dry evaporator) and configured to receive the gaseous hydrocarbon portion 20 and heat the gaseous hydrocarbon portion 20, for example, prior to the gaseous hydrocarbon portion 20 reaching the mixing unit 78. For example, the gaseous portion 20 may be heated to a temperature ranging from 400 degrees C. to 650 degrees C. (e.g., 450 degrees C. to 600 degrees C.) by the gaseous portion heater 74. The heat from the heated gaseous portion 20, along with the superheated dilution steam 50 received at the mixing unit 78, may be used to at least partially evaporate the liquid portion 22 received at the mixing unit 78. Similar to the example shown in FIG. 5, the vaporization assembly 10 shown in FIG. 6 may include an inlet heater 76 downstream of the mixing unit 78 (and in some embodiments, a separator) configured to receive the hydrocarbon-steam mixture 72 from the mixing unit 78 and to heat the hydrocarbon-steam mixture 72 to a temperature closer to the desired inlet temperature for the one or more furnace(s) 16. Relative to the embodiment shown in FIG. 5, the embodiment shown in FIG. 6 may result in a relatively lower temperature in the evaporator 18, which may inhibit or prevent fouling, and the steam-to-hydrocarbon (S/O) ratio may be relatively reduced.

Figure 7:
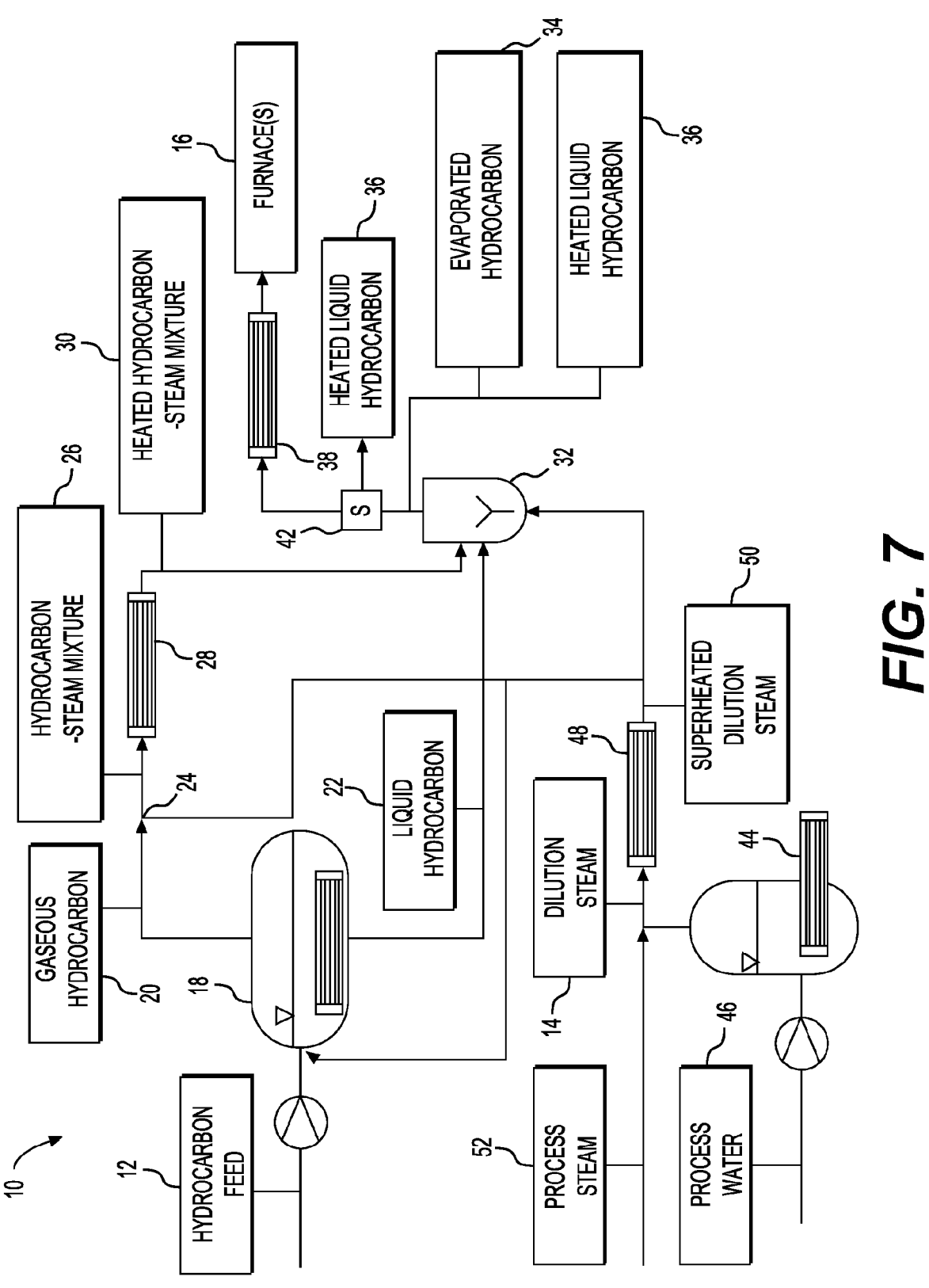
FIG. 7 schematically illustrates still a further example vaporization assembly according to embodiments of the disclosure.

FIG. 7 schematically illustrates still a further example vaporization assembly 10 for enhancing vaporization of the hydrocarbon feed 12 according to embodiments of the disclosure. In the embodiment shown in FIG. 7, the vaporization assembly 10 may include an evaporator 18 (e.g., a dry evaporator) positioned to receive the hydrocarbon feed 12 and at least partially evaporate the hydrocarbon feed 12 to provide a gaseous hydrocarbon portion 20 and a liquid hydrocarbon portion 22. Although the embodiment shown in FIG. 7 (as well as other embodiments) may include electrically-powered heaters and components, any electrically-powered heaters or components may be replaced and/or supplemented by non-electrically-powered components. Some embodiments consistent with FIG. 7 may not necessarily include an evaporator 18. For example, if the hydrocarbon feed 12 is derived from pyoils, for example, produced at the site of the vaporization assembly 10 (either hydrotreated or not hydrotreated), the pyoils may be distilled and may have an elevated temperature. In at least some such instances, the evaporator 18 may be excluded or bypassed.

As shown in FIG. 7, in some embodiments, the vaporization assembly 10 may further include a first mixing unit 24 configured to receive the gaseous hydrocarbon portion 20 and dilution steam 14 and to combine the gaseous hydrocarbon portion 20 and the dilution steam 14 to provide a hydrocarbon-steam mixture 26. In some embodiments, the hydrocarbon-steam mixture 26 may have a steam-to-hydrocarbon (S/O) ratio ranging from 0.3 to 2.0. The dilution steam 14 may be used to heat the gaseous hydrocarbon portion 20 in the first mixing unit 24. For example, the dilution steam 14 may be superheated, for example, by a steam heater 48, and the superheated dilution steam 50 may increase the temperature of the gaseous hydrocarbon portion 20, such that the hydrocarbon-steam mixture 26 has a temperature closer to, for example, a desired a furnace inlet temperature. For example, the superheated dilution steam 50 may have a temperature ranging from 500 degrees C. to 600 degrees C. (e.g., about 550 degrees C.).

As shown in FIG. 7, in some embodiments, the vaporization assembly 10 also may include a heater 28 configured to receive the hydrocarbon-steam mixture 26 and heat the hydrocarbon-steam mixture 26 to provide a heated hydrocarbon-steam mixture 30. In some embodiments, mixing the hydrocarbon feed 12 and/or the gaseous hydrocarbon portion 20 with at least a portion of the superheated dilution steam 50, for example, in the first mixing unit 24, upstream relative to the heater 28 may result in reducing the hydrocarbon partial pressure and/or reducing the fouling potential of the gaseous hydrocarbon portion 20 in the heater 28 and/or other components of the vaporization assembly 10. The heater 28 may include submerged heating tubes, a thermos-syphon, forced circulation, a double-shell system including a heat transfer medium, one or more of an electric shell-and-tube heat exchanger or a non-electric shell-and-tube heat exchanger, a non-electric shell-and-tube heat exchanger using as a heat source saturated, high-pressure steam generated in a transfer-line exchanger (TLE), and/or a heat integration stream.

As shown in FIG. 7, in some embodiments, the vaporization assembly 10 may include a second mixing unit 32 configured to receive the liquid hydrocarbon portion 22 and the heated hydrocarbon-steam mixture 30 and to evaporate at least a portion of the liquid hydrocarbon portion 22, for example, via energy associated with the heated hydrocarbon-steam mixture 30, to provide an evaporated hydrocarbon portion 34 and/or a heated liquid hydrocarbon portion 36.

In some embodiments, for example, as shown in FIG. 7, the vaporization assembly 10 also may include a second heater 38 positioned to receive the heated hydrocarbon-steam mixture 30 and/or the evaporated hydrocarbon portion 34, and heat the heated hydrocarbon-steam mixture 30 and/or the evaporated hydrocarbon portion 34. For example, the second heater 38 may be configured to heat the heated hydrocarbon-steam mixture 30 and/or the evaporated hydrocarbon portion 34 to a temperature ranging from, for example, 500 degrees C. to 800 degrees C. (e.g., from 550 degrees C. to 750 degrees C.). For example, the second heater 38 may be configured to heat the heated hydrocarbon-steam mixture 30 and/or the evaporated hydrocarbon portion 34 to a temperature for being supplied to a cracking furnace inlet. The second heater 38 may be a heater including one or more of an electrically-powered heater, a heat exchanger supplied with steam, a heat source integrated with a production facility (e.g., an olefin production facility, such as a cracking furnace), and/or any other suitable heater type.

Although not shown in FIG. 7, in some embodiments, the vaporization assembly 10 may include a separator configured to receive the gaseous hydrocarbon portion 20 and the liquid hydrocarbon portion 22 and to separate the gaseous hydrocarbon portion 20 from the liquid hydrocarbon portion 22. In some embodiments, the separator may be upstream relative to the first mixing unit 24, for example, as shown in FIG. 1. In some embodiments, the separator may be an integrated portion of the evaporator 18, and in some embodiments, the separator may be separate from the evaporator 18.

In some embodiments, as shown in FIG. 7, the vaporization assembly 10 may include a separator 42 configured to receive the heated hydrocarbon-steam mixture 30 and one or more of the evaporated hydrocarbon portion 34 or the heated liquid hydrocarbon portion 36, and to separate the heated liquid hydrocarbon portion 36 from the heated hydrocarbon-steam mixture 30 and/or the evaporated hydrocarbon portion 34. As shown, in some embodiments, the separator 42 may be upstream of the second heater 38. In some embodiments, the separator 42 may be an integrated portion of the second mixing unit 32, and in some embodiments, the separator 42 may be separate from the second mixing unit 32.

As shown in FIG. 7, in some embodiments, the vaporization assembly 10 may include a heater 44 positioned to receive process water 46 and to heat the process water 46 to provide dilution steam 14. In some embodiments, the heater 44 may include an electrically-powered heater and/or heat may be supplied from other systems associated with the production facility. For example, the heater 44 may be, or include, a dilution steam generator, for example, heat-integrated with a steam cracker radiation section. As shown in FIG. 7, some embodiments of the vaporization assembly 10 may include a steam heater 48 configured to receive dilution steam 14 and heat the dilution steam 14 to provide superheated dilution steam 50. In some embodiments, the steam heater 48 may also be configured to receive process steam 52 from, for example, the production facility, and the steam heater 48 may heat the process steam 52 and the dilution steam 14 to provide the superheated dilution steam 50. In some embodiments, the fouling potential for the steam heater 48 may be relatively lower than other heaters in the vaporization assembly 10, and increasing the temperature of the dilution steam 14 via the steam heater 48 may result in reducing the heat added at the heater 28 and/or the heater 38. This may reduce the fouling potential in the heater 28 and/or the heater 38. Some embodiments may not include the steam heater 48 and/or the heater 38.

As shown in FIG. 7, in some embodiments, the evaporator 18 may be configured to receive dilution steam 14 to heat the hydrocarbon feed 12, for example, upstream relative to the evaporator 18 or at the evaporator 18. In some embodiments, the second mixing unit 32 may be configured to receive dilution steam 14 to heat the liquid hydrocarbon portion 22 and the heated hydrocarbon-steam mixture 30. In some embodiments, dilution steam 14 may be added at any location in the vaporization assembly 10 to aid vaporization of the hydrocarbons, to reduce the likelihood of fouling, and/or to improve or optimize use of different duties provided in the respective heaters.

In some embodiments, pressure-changing devices, such as, for example, pumps, compressors, valves, restriction orifices, etc., may be incorporated into the vaporization assembly 10 at any location, for example, to maintain the indicated flow direction, as will be understood by those skilled in the art. The temperatures and/or pressures described herein may be adjusted, for example, depending on the content of the hydrocarbon feed 12 to improve or optimize operation of portions of the vaporization assembly 10. One or more of the heaters and/or one or more of the heat exchangers described herein may be single, multiple parallel, and/or cascaded heaters/heat exchangers.

Relative to the example embodiment shown in FIG. 6, the vaporization assembly 10 shown in FIG. 7 may result in reducing fouling in the heater 28 downstream relative to the evaporator 18. In the embodiment shown in FIG. 7, the superheated dilution steam 50 supplied upstream relative to the heater 28 may heat the gaseous hydrocarbon portion 20, such that the partial pressure of the hydrocarbons in the hydrocarbon portion 20 is relatively reduced, thereby potentially reducing or eliminating fouling. In some embodiments, this may also increase heat transfer in the heater 28.

In some embodiments, the evaporator 18 may include a heater including one or more of an electrically-powered heater, a heat exchanger supplied with steam, a heat exchanger supplied with hot effluent from a furnace (e.g., a radiation furnace), or a heat source integrated with a production facility (e.g., an olefin production facility, such as a cracking furnace). For example, the evaporator 18 may include submerged heating tubes, a thermos-syphon, forced circulation, a double-shell system including a heat transfer medium, one or more of an electrically-powered shell-and-tube heat exchanger or a non-electrically-powered shell-and-tube heat exchanger, a non-electrically-powered shell-and-tube heat exchanger using as a heat source saturated, high-pressure steam generated in a transfer-line exchanger (TLE), and/or a heat integration stream. In some embodiments, the evaporator 18 may be operated, for example, such that heated surfaces of the evaporator 18 have a surface temperature of 450 degrees C. or less. This may reduce the likelihood of, or prevent, fouling caused by overheating the hydrocarbon feed 12.

Figure 8:
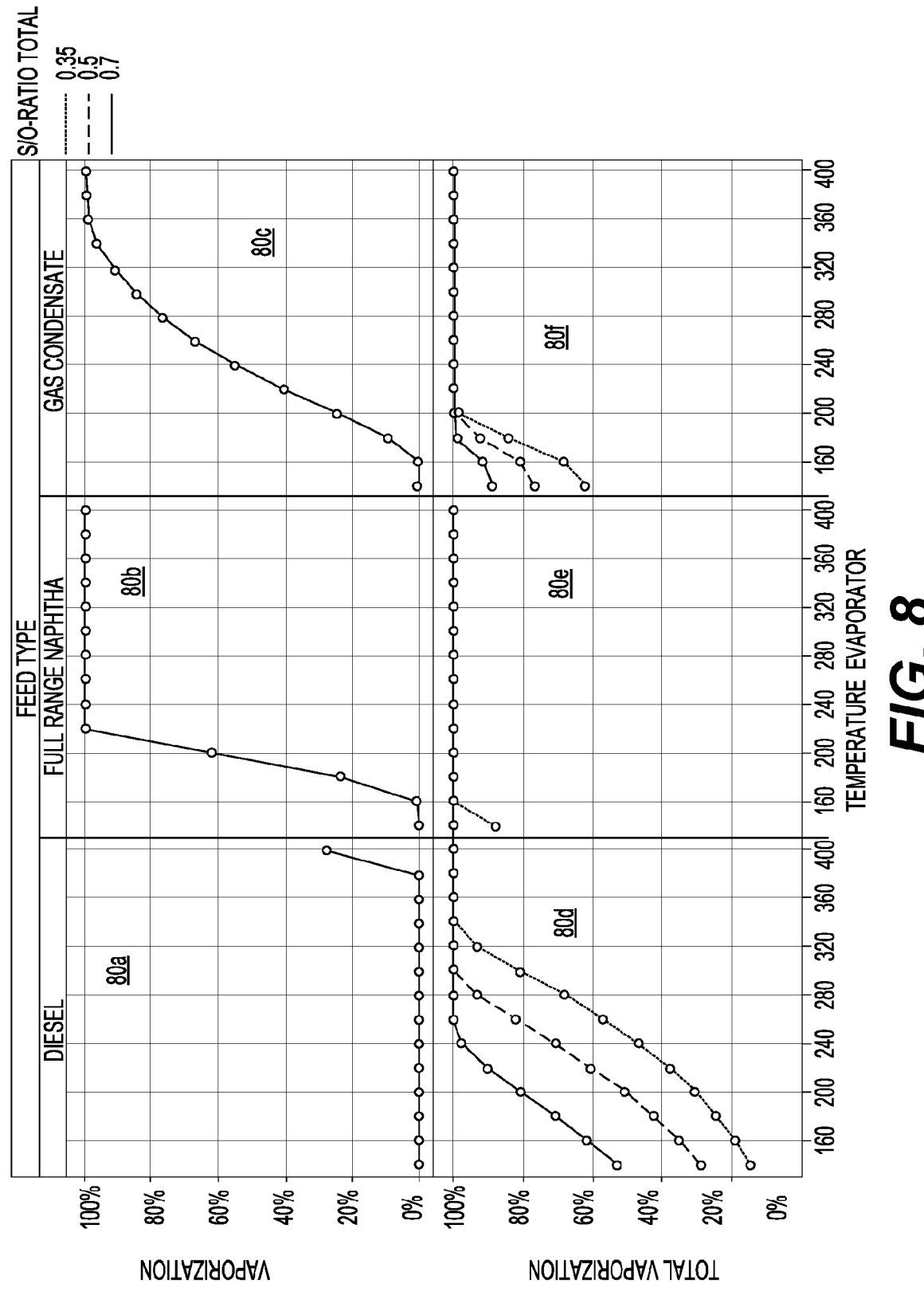
FIG. 8 shows graphs for the example vaporizer assembly shown in FIG. 7 of percent vaporization (%) versus evaporator temperature (degrees C.), and graphs of the percentage of total hydrocarbon evaporation (%) after a mixing unit, for three example hydrocarbon feeds having three steam-to-hydrocarbon (S/O) ratios, according to embodiments of the disclosure.

FIG. 8 shows graphs 80*a*, 80*b*, and 80*c* for the embodiment of vaporizer assembly 10 shown in FIG. 7 of percent vaporization (%) at the evaporator 18 versus evaporator temperature (degrees c.) for three example hydrocarbon feeds 12 having three steam-to-hydrocarbon (S/O) ratios, according to embodiments of the disclosure. FIG. 8 also shows three graphs 80*d*, 80*e*, and 80*f* for the embodiment of vaporizer assembly 10 shown in FIG. 7 of the percentage of total hydrocarbon evaporation (%) after the second mixing unit 32, but before the second heater 38 for the three example hydrocarbon feeds having three steam-to-hydrocarbon (S/O) ratios, according to embodiments of the disclosure (e.g., see the heated hydrocarbon-steam mixture 30 and the evaporated hydrocarbon 34 shown in FIG. 7). In particular, FIG. 8 shows the modeling results at a pressure of 8 bar and with a superheated steam temperature of 550 degrees C. for each of the hydrocarbon feeds (i.e., diesel (graphs 80*a* and 80*d*), a full range naphtha (FRN) (graphs 80*b* and 80*e*), and a gas condensate (graphs 80*c* and 80*e*)).

As shown in graphs 80*b* and 80*e*, the FRN could theoretically already be fully evaporated at temperatures as low as 240 degrees C. without adding steam. However, full evaporation may not be desirable and thus a temperature ranging from 160 degrees C. to 220 degrees C. may be chosen to avoid total evaporation. A steam-to-hydrocarbon (S/O) ratio of 0.35 may be sufficient to fully evaporate the FRN. As shown in graph 80*c*, the gas condensate, which may be heavier than FRN, only begins to evaporate at about 160 degrees C. in the evaporator 18. As shown in graph 80*f*, full evaporation of the gas condensate may begin after the second mixing unit 32 and may be achieved at a temperature of about 200 degrees C. or higher in the evaporator 18, for example, depending on the steam-to-hydrocarbon (S/O) ratio. The diesel is the heaviest hydrocarbon feed shown in FIG. 8. As shown in graph 80*a*, up to a temperature of about 380 degrees C., the diesel exhibits almost no evaporation in the evaporator 18. However, as shown in graph 80*d*, after mixing the diesel with superheated dilution steam 50, after the second mixing unit 32, full evaporation of the diesel is possible even at relatively low temperatures in the evaporator 18 (e.g., from about 280 degrees C. to about 360 degrees C., depending on the steam-to-hydrocarbon (S/O) ratio).

Figure 9:
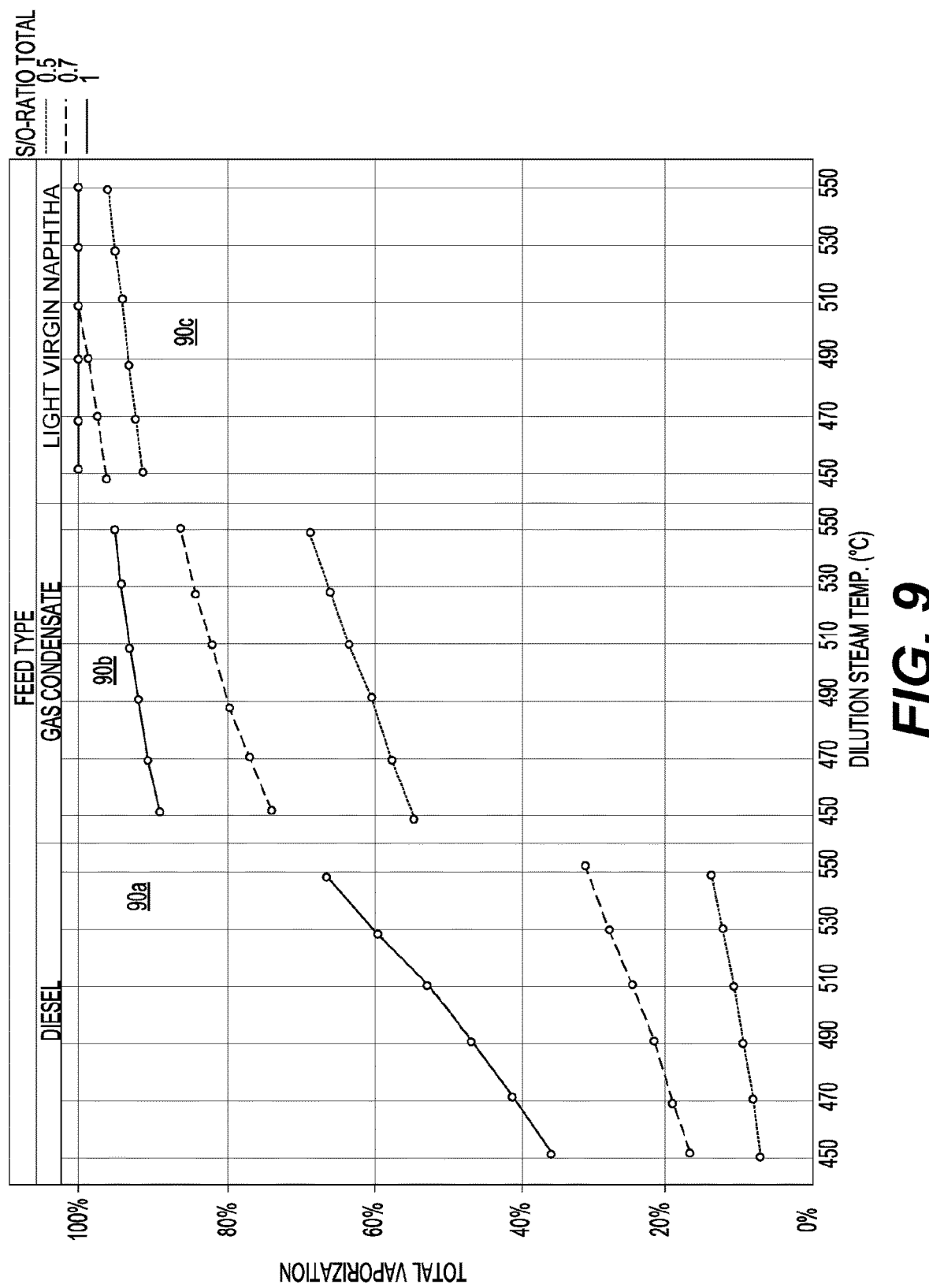
FIG. 9 shows graphs of percent vaporization (%) versus dilution steam temperature (degrees C.) for three example hydrocarbon feeds having three steam-to-hydrocarbon (S/O) ratios, according to embodiments of the disclosure.

FIG. 9 shows three graphs 90*a*, 90*b*, and 90*c* for the embodiment of vaporizer assembly 10 shown in FIG. 7 of percent vaporization (%) versus dilution steam temperature (degrees c.) for three example hydrocarbon feeds having three steam-to-hydrocarbon (S/O) ratios, according to embodiments of the disclosure. For the purpose of comparison, FIG. 9 shows three graphs 90*a*, 90*b*, and 90*c* modeling results of hydrocarbon evaporation with dilution steam only (e.g., consistent with the example shown in FIG. 2). For each of a diesel feed (graph 90*a*), a gas condensate feed (graph 90*b*), and a light virgin naphtha feed (graph 90*c*), the feed at 60 degrees C., which is a typical inlet temperature to a convection section of a steam cracking cracker, was mixed with superheated dilution steam at different steam-to-hydrocarbon (S/O) ratios at a pressure of 6 bar. As shown in the graphs 90*a*, 90*b*, and 90*c*, even for the light virgin naphtha feed (graph 90*c*), a S/O ratio of 0.5 is insufficient for achieving complete evaporation at steam temperatures lower than 550 degrees C. For the other feeds (diesel in graph 90*a* and gas condensate in graph 90*b*), complete evaporation is not possible within the constraints set for the modeling, in particular, an S/O ratio of one or less and a dilution steam temperature of 550 degrees C. or less.

FIG. 10 is a block diagram of an example method to enhance vaporization of a hydrocarbon feed according to embodiments of the disclosure, illustrated as a collection of blocks in a logical flow graph, which represent a sequence of operations. For example, the hydrocarbon feed may include, but is not limited to, one or more of ethane, propane, liquefied petroleum gas (e.g., C4-LPG), naphtha, gas condensate, gas oil, diesel, jet fuel, gas-to-liquid (GTL) fuel, pyoils, feedstocks derived from recycled plastics, or bio-feedstock, and the vaporization of the hydrocarbon feed may be part of a process to crack the hydrocarbons, for example, as part of a hydrocarbon cracking process, part of a process to produce hydrogen, for example, as part of a methane reformation process, as part of a hydrotreating process for pyoils, or as part of a dehydrogenation process. Other types of feeds and/or heating processes are contemplated. The order in which the operations are described is not intended to be construed as a limitation, and any number of the described blocks may be combined in any order and/or in parallel to implement the method.

As shown in FIG. 10, the example method 1000, at 1002, may include supplying a hydrocarbon feed to an evaporator. The hydrocarbon feed may include hydrocarbon components having a wide boiling range. The evaporator may include, for example, a heater comprising one or more of an electrically-powered heater, a heat exchanger supplied with steam, a heat exchanger supplied with hot effluent from a furnace, or a heat source integrated with a production facility. The evaporator may include submerged heating tubes, a thermos-syphon, forced circulation, a double-shell system including a heat transfer medium, one or more of an electrically-powered shell-and-tube heat exchanger or a non-electrically-powered shell-and-tube heat exchanger, a non-electrically-powered shell-and-tube heat exchanger using as a heat source saturated, high-pressure steam generated in a transfer-line exchanger, and/or a heat integration stream.

At 1004, the example method 1000 may include heating via the evaporator the hydrocarbon feed to provide a gaseous hydrocarbon portion and a liquid hydrocarbon portion, for example, as described herein. In some embodiments, the example method 1000 may include supplying dilution steam to the evaporator and heating the hydrocarbon feed via the dilution steam.

The example method 1000, at 1006, may include separating the gaseous hydrocarbon portion from the liquid hydrocarbon portion. In some embodiments, the separation may occur in the evaporator, and in some embodiments, the separation may occur in a separation device separate from the evaporator.

At 1008, the example method 1000 may include adding dilution steam to the gaseous hydrocarbon portion to provide a heated hydrocarbon-steam mixture. For example, dilution steam may be supplied to a mixing unit that receives the gaseous hydrocarbon portion, and the added dilution steam may heat the gaseous hydrocarbon portion. In some embodiments, the dilution steam may be superheated dilution steam.

At 1010, the example method 1000 may include combining the heated hydrocarbon-steam mixture with the liquid hydrocarbon portion to evaporate at least a portion of the liquid hydrocarbon portion via energy associated with the heated hydrocarbon-steam mixture to provide one or more of an evaporated hydrocarbon portion or a heated liquid hydrocarbon portion. For example, the hydrocarbon-steam mixture and the liquid hydrocarbon portion may be supplied to a mixing unit, and heat from the hydrocarbon-steam mixture may at least partially evaporate the liquid hydrocarbon portion. In some embodiments, the hydrocarbon-steam mixture may be heated, for example, by a heater, prior to being supplied to the mixing unit. In some embodiments, dilution steam may be supplied to the mixing unit to heat the liquid hydrocarbon portion and/or the heated hydrocarbon-steam mixture.

The example method 1000, at 1012, may include separating the heated liquid hydrocarbon portion from the heated hydrocarbon-steam mixture and the evaporated hydrocarbon portion. In some embodiments, the separation may occur in the heater, and in some embodiments, the separation may occur in a separation device separate from the heater.

At 1014, the example method 1000 may include heating the hydrocarbon-steam mixture and/or the evaporated hydrocarbon portion to a cracking furnace inlet temperature. For example, the hydrocarbon-steam mixture and/or the evaporated hydrocarbon portion may be heated to a temperature ranging from 500 degrees C. to 800 degrees C. (e.g., from 550 degrees C. to 750 degrees C.).

The example method 1000, at 1016 may include controlling a steam-to-hydrocarbon (S/O) ratio of the hydrocarbon-steam mixture and/or a temperature of one or more heaters used to heat one or more of the hydrocarbon feed, the dilution steam, the hydrocarbon-steam mixture, the evaporated hydrocarbon portion, or the heated liquid hydrocarbon portion.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments. It is, therefore, to be understood that the embodiments described herein are presented by way of example only and that, within the scope of any appended claims and equivalents thereto, the embodiments of the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present disclosure as set forth in the appended claims.

What is claimed is:

1. A vaporization assembly to enhance vaporization of a hydrocarbon feed in an electrically-powered steam cracking furnace, the vaporization assembly comprising:

an electrically-powered evaporator positioned to receive a hydrocarbon feed and partially evaporate the hydrocarbon feed to provide a gaseous hydrocarbon portion and a liquid hydrocarbon portion;

a first mixing unit positioned to receive the gaseous hydrocarbon portion and dilution steam and to combine the gaseous hydrocarbon portion and the dilution steam to provide a hydrocarbon-steam mixture;

an electrically-powered heater positioned to receive the hydrocarbon-steam mixture and heat the hydrocarbon-steam mixture to provide a heated hydrocarbon-steam mixture; and a second mixing unit positioned to receive the liquid hydrocarbon portion and the heated hydrocarbon-steam mixture and to evaporate at least a portion of the liquid hydrocarbon portion via energy associated with the heated hydrocarbon-steam mixture to provide one or more of an evaporated hydrocarbon portion or a heated liquid hydrocarbon portion.

2. The vaporization assembly of claim 1, wherein the electrically-powered heater comprises a first electrically-powered heater, and the vaporization assembly further comprises a second electrically-powered heater positioned to receive one or more of the heated hydrocarbon-steam mixture or the evaporated hydrocarbon portion, and heat the one or more of the heated hydrocarbon-steam mixture or the evaporated hydrocarbon portion.

3. The vaporization assembly of claim 1, further comprising a separator positioned to receive the gaseous hydrocarbon portion and the liquid hydrocarbon portion and to separate an evaporated portion of the gaseous hydrocarbon portion and the liquid hydrocarbon portion from a liquid portion of the gaseous hydrocarbon portion and the liquid hydrocarbon portion.

4. The vaporization assembly of claim 1, further comprising a separator positioned to receive the heated hydrocarbon-steam mixture and one or more of the evaporated hydrocarbon portion or the heated liquid hydrocarbon portion, and to separate an evaporated portion of the heated hydrocarbon-steam mixture, the evaporated hydrocarbon portion, and the heated liquid hydrocarbon portion from a liquid portion of the heated hydrocarbon-steam mixture, the evaporated hydrocarbon portion, and the heated liquid hydrocarbon portion.

5. The vaporization assembly of claim 1, wherein one or more of:

the evaporator is positioned to receive dilution steam and to heat the hydrocarbon feed; or the second mixing unit is positioned to receive dilution steam and heated liquid hydrocarbon portion and the heated hydrocarbon-steam mixture.

6. The vaporization assembly of claim 1, wherein the electrically-powered heater comprises a first electrically-powered heater, and the vaporization assembly further comprises a second electrically-powered heater positioned to receive process water and to heat the process water to provide the dilution steam.

7. The vaporization assembly of claim 1, further comprising a steam heater positioned to receive dilution steam and heat the dilution steam to provide superheated dilution steam.

8. The vaporization assembly of claim 7, wherein the superheated dilution steam is provided at one or more of the evaporator, the first mixing unit, or the second mixing unit.

9. The vaporization assembly of claim 1, wherein the evaporator comprises an evaporator heater, the evaporator heater being electrically-powered.

10. The vaporization assembly of claim 1, wherein the evaporator comprises an electrically-powered vaporizer tube bundle, and the tube bundle is submerged in liquid naphtha.

11. The vaporization assembly of claim 1, wherein the evaporator comprises heated surfaces having a surface temperature of 450° C. or less.

12. A method to enhance vaporization of a hydrocarbon feed in an electrically-powered steam cracking furnace, the method comprising:

supplying a hydrocarbon feed to an evaporator;

heating utilizing electric heating and not flue gas heating, via the evaporator the hydrocarbon feed to provide a gaseous hydrocarbon portion and a liquid hydrocarbon portion;

separating the gaseous hydrocarbon portion from the liquid hydrocarbon portion;

adding dilution steam to the gaseous hydrocarbon portion to provide a heated hydrocarbon-steam mixture; and combining the hydrocarbon-steam mixture with the liquid hydrocarbon portion to evaporate at least a portion of the liquid hydrocarbon portion via energy associated with the hydrocarbon-steam mixture to provide one or more of an evaporated hydrocarbon portion or a heated liquid hydrocarbon portion.

13. The method of claim 12, further comprising heating the one or more of the heated hydrocarbon-steam mixture or the evaporated hydrocarbon portion to an electrically-powered steam cracking furnace inlet temperature ranging from 500 degrees C. to 800 degrees C.

14. The method of claim 12, further comprising separating the heated hydrocarbon-steam mixture and the electrically-powered evaporated hydrocarbon portion from the heated liquid hydrocarbon portion.

15. The method of claim 12, further comprising one or more of:

supplying dilution steam to the evaporator and heating the hydrocarbon feed via the dilution steam; or supplying dilution steam to a mixing unit to heat one or more of the liquid hydrocarbon portion or the heated hydrocarbon steam mixture.

16. The method of claim 12, further comprising controlling one or more of:

a steam-to-hydrocarbon ratio of the hydrocarbon-steam mixture; or a temperature of one or more heaters used to heat one or more of the hydrocarbon feed, the dilution steam, the hydrocarbon-steam mixture, the evaporated hydrocarbon portion, or the heated liquid hydrocarbon portion.

17. The method of claim 12, further comprising controlling the maximum temperature of electrical heating elements within the evaporator.

18. The method of claim 16, wherein the hydrocarbon-steam mixture has a steam to hydrocarbon ratio (S/O) of 0.3 to 2.0.

* * * * *